United States Patent Office 3,184,437
Patented May 18, 1965

3,184,437
PRODUCTION OF BRANCHED AND CROSS-LINKED COPOLYMERS FROM OLEFINICALLY UNSATURATED MONOMERS CONTAINING THE N-NITROSOACYLAMINE GROUP
Adolf Hrubesch and Hans Craubner, Ludwigshafen (Rhine), Germany, assignors to Badische Anilin- & Soda-Fabrik Aktiengesellschaft, Ludwigshafen (Rhine), Germany
No Drawing. Filed Dec. 8, 1960, Ser. No. 74,457
Claims priority, application Germany, Dec. 11, 1959, B 55,871
4 Claims. (Cl. 260—78)

This invention relates to the production of branched and crosslinked copolymers from olefinically unsaturated monomers.

Branching and crosslinking of chain molecules exert a strong influence on the physical properties of polymers. It is known that they can be caused by transfer reactions and by copolymerization with monomers containing a multiple unsaturation. Linear chain molecules can also be crosslinked by irradiation with energy-rich rays or branched by graft reactions.

It is the object of the present invention to produce branched and crosslinked copolymers by means of a new kind of polymerization method.

We have found that branched and crosslinked copolymers can be advantageously prepared by copolymerization of olefinically unsaturated monomers with olefinically unsaturated N-nitrosoacylamines. Copolymerization according to the invention is preferably carried out in bulk or in solution, advantageously at temperatures between about −20° and about +180° C. while stirring or, if necessary, kneading. It is advantageous to polymerize at temperatures between room temperature and about 120° C., preferably between about 50° and 100° C. The new kind of copolymerization may also be carried out in emulsion or suspension at temperatures between room temperature and about 100° C.

Olefinically unsaturated monomers suitables for the purposes of the present invention are especially acrylic compounds, such as acrylonitrile, methacrylonitrile, acrylamide, methacrylamide and acrylic and methacrylic acids and their esters with linear, branched or cycloaliphatic alcohols with 1 to 12 carbon atoms, such as methanol, ethanol, propyl alcohol, isopropyl alcohol, normal butanol, 2-ethylhexyl alcohol, cyclohexanol, cyclo-octanol, decyl alcohol and lauryl alcohol as well as vinylaromatic compounds such as styrene, o-chlorostyrene, vinyltoluenes and α-methylstyrene, or also vinyl esters of a linear aliphatic carboxylic acid with 2 or 3 carbon atoms, such as vinyl acetate and vinyl propionate. Mono-olefines with 2 to 4 carbon atoms, such as ethylene, propylene, butylene-1, butylene-2 and isobutylene, diolefines, such as butadiene, 2-chlorbutadiene and isoprene, vinyl halides, such as vinyl chloride and vinylidene chloride, vinyl ethers of linear or branched aliphatic alcohols with 1 to 12 carbon atoms, such as methyl vinyl ether, isobutyl vinyl ether, hexyl vinyl ether, 2-ethylhexyl vinyl ether, decyl vinyl ether and lauryl vinyl ether, and also vinyl sulfonic acids are suitable as olefinically unsaturated monomers. Such olefinically unsaturated monomers can be copolymerized with N-nitrosoacylamines either singly or in admixture with each other.

Suitable N-nitrosoacylamines are low molecular weight compounds, i.e., compounds with molecular weights between 114 and 700, which contain in the molecule at least one olefinic double bond and at least one N-nitrosoacylamine group, i.e., a group of the general formula:

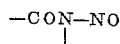

N-nitrosoacylamines which contain in the molecule one olefinic double bond and one N-nitrosoacylamine group yield by copolymerization according to this invention high molecular weight products which are only branched and practically not crosslinked, provided that the olefinically unsaturated monomers used as copolymerization components contain in the molecule only one olefinic double bond. On the other hand if, in the copolymerization according to this invention, low molecular weight N-nitrosoacylamines, i.e., N-nitrosoacylamines with molecular weights between about 140 and 700, are used which contain in the molecule more than one, i.e., for example 2 or 3, N-nitrosoacylamine groups and/or more than one, i.e., for example 2 or 3 olefinic double bonds, high molecular weight products are obtained whose molecules are crosslinked or both branched and crosslinked. Products in which the molecules are branched and crosslinked are obtained especially when mixtures of N-nitrosoacylamines with only one olefinic double bond and only one N-nitrosoacylamine group and N-nitrosoacylamines with more than one N-nitrosoacylamine group and/or more than one olefinic double linkage in the molecule are polymerized in admixture with olefinically unsaturated monomers of the above specified kind.

Suitable N-nitrosoacylamines include those which contain in the molecule the structural units of the general Formulas I to III one or more times and in which the nitrogen atom bearing the N-nitrosoacylamine group is attached with its third valency to a carbon atom:

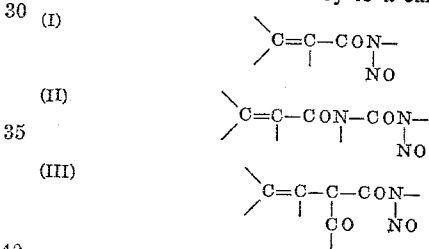

Such N-nitrosoacylamines can readily be prepared, by the use of conventional nitrozation reactions, from the corresponding amides, i.e., for example from compounds which contain one or more times the structural units of the general Formulas Ia to IIIa:

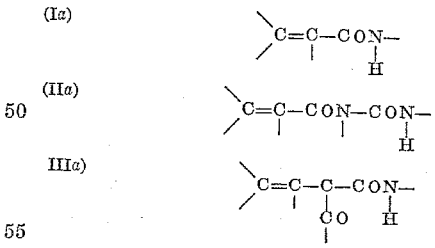

The amides, which may be dissolved or suspended in solvents, such as water, trichlorethylene, chloroform, carbon tetrachloride, octane, cyclohexane, benzene or toluene, may be reacted at temperatures between about −10° and about +40° C., in general between −5° and +10° C. with equivalent amounts (with reference to the content of CONH— groups in the amides) of nitrozation agents, such as nitrous acid, dinitrogen trioxide, nitrosyl chloride or alkyl nitrites.

Especially suitable olefinically unsaturated N-nitrosoacylamines which contain structural units of the general Formula I can readily be prepared in this way from amides of aliphatic and cycloaliphatic carboxlyic acids with 3 to 8 carbon atoms which are olefinically unsaturated in α,β-position and of which the amide nitrogen atom bears, in addition to a hydrogen atom, a linear or branched alkyl, alkenyl or acyl radical with 1 to 20, preferably 5 to 18 carbon atoms, a cycloaliphatic radical with 5 to 12, preferably 6 to 8 carbon atoms or an aralkyl or aryl radical with 6 to 10 carbon atoms, preferably a benzyl radical. Such carboxylic acids olefinically unsaturated in α,β-position are especially the monocarboxylic acids: acrylic acid, methacrylic acid and crotonic acid, and the dicarboxylic acids: maleic acid, fumaric acid, itaconic acid and mesaconic acid, and also cyclohexene-1-yl-carboxylic acid and methylcyclohexene-1-yl-carboxylic acid. Alkyl radicals with 1 to 20 carbon atoms include the methyl, ethyl, butyl, pentyl, isopentyl, hexyl, 2-ethylhexyl, octyl, decyl, isodecyl, lauryl, palmityl and stearyl radicals. Alkenyl and acyl radicals with 1 to 20 carbon atoms include the allyl, butene-2-yl, oleyl, acetyl, valeroyl, stearoyl and oleoyl radicals. Cycloaliphatic radicals with 5 to 12 carbon atoms include the cyclopentyl, cyclohexyl, methylcyclohexyl, cyclo-octyl, cyclodecyl and cyclododecyl radicals.

Especially suitable olefinically unsaturated N-nitroso compounds which contain one or two structural units of the general Formula I can also be readily prepared by nitrozation of amides of the above-mentioned monocarboxylic and dicharboxylic acids in which two such acid amides are combined with each other by way of their amide nitrogen atoms and divalent aliphatic or cycloaliphatic radicals. Such amides of carboxylic acids with 3 to 8 carbon atoms unsaturated in α,β-position accordingly contain structural units of the general formula (Ib)
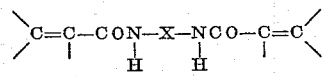

in which X is preferably a divalent linear or branched aliphatic radical with 1 to 12 carbon atoms or a divalent cycloaliphatic radical with six ring carbon atoms, i.e., for example a methylene, tetramethylene, hexamethylene, octamethylene 2-methylhexamethylene, decamethylene or dodecamethylene radical or a divalent radical of cyclohexane.

Examples of amides of this kind are acrylic and methacrylic acid N-methyl, butyl, lauryl, palmityl, stearyl, allyl, oleyl, pentyl, hexyl, cyclohexyl, 2-ethylhexyl, cyclooctyl, decyl and benzylamide, crotonic acid N-hexyl, cyclohexyl and benzyl-amide, diacryloylimide, dioleylimide, maleic and fumaric acid N-butyl, isopentyl, allyl, 2-ethylhexyl, cyclohexyl, cyclooctyl, lauryl, stearyl and benzyl monoamide and their esters with aliphatic alcohols, such as methanol, propanol and butanol, fumaric acid-N,N'-dibutyl, -dihexyl, -didecyl, -dicyclohexyl, -distearyl and -dibenzyl diamide, maleic acid-N-methyl-N'-hexyl diamide, fumaric acid-N-butyl-N'-benzyl diamide, itaconic acid-N-butyl monoamide, mesaconic acid-N,N'dibenzyl diamide, N,N'-methylene-bis-acrylamide and -methacrylamide, N,N'-hexamethylene-bis-acrylamide and -methacrylamide, N,N'-cyclohexylene-1,4-bis-acrylamide and -methacrylamide, N,N'-diallylhexahydroterephthalic acid diamide, N,N'-methylene-bis-crotonamide, cyclohexene-1-yl-carboxylic acid-N-methylamide, N,N'-methylene-bis-cyclohexene-1-yl-carboxylic acid amide and N,N'-hexamethylene-bis-(maleic acid monoamide) (i.e.,

HOOC—CH=CH—CONH—(CH$_2$)$_6$—NHCO—CH=CH—COOH)

or its esters with aliphatic alcohols, preferably containing 1 to 4 carbon atoms, such as methanol, ethanol and butanol.

Suitable N-nitrosoacylamines which contain structural units of the general Formula II can be readily prepared in an analogous way, while using conventional nitrozation agents, by nitrozation of substituted linear and cyclic ureides of carboxylic acids, unsaturated in α,β-position of the above-mentioned kind which contain at least one CONH— group. Suitable ureides contain as substituents at one or more ureide nitrogen atoms, i.e., for example at two or, in the case of diureides, at 3 or 4 ureide nitrogen atoms, linear or branched alkyl and/or alkenyl radicals with 1 to 20, preferably 1 to 10 carbon atoms, cycloalkyl radicals with 5 to 12, preferably 6 to 8 carbon atoms or aralkyl or aryl radicals with 6 to 10 carbon atoms, preferably benzyl radicals. Especially suitable olefinically unsaturated N-nitrosoacylamines can also be prepared by nitrozation of ureides of the above-mentioned monocarboxylic and dicarboxylic acids in which two such ureides are joined together by way of nitrogen atoms of their ureido groups and divalent aliphatic or cycloaliphatic radicals. Such bis-ureides accordingly contain structural units of the general Formula IIb:

(IIb)
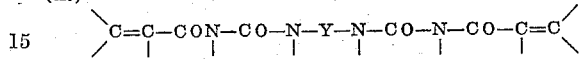

in which Y is preferably a divalent linear, branched or cycloaliphatic radical with 1 to 6 carbon atoms which may contain an olefinic double bond. Examples of such radicals Y are the methylene, ethylene, tetramethylene, butene-2-ylene-1,4, hexamethylene and cyclohexylene-1, 4 radicals.

Examples of ureides of the said kind are N-methyl acrylic, methacrylic and crotonic acid ureides, N,N'-dimethyl methacrylic acid ureide, N,N'-dimethyl acrylic and methacrylic acid ureides, N'-cyclohexylmethacrylic acid ureide, N'-stearylmethacrylic acid ureide, N'-oleylmethacrylic acid ureide, N,N'-di-2-ethylhexyl acrylic acid ureide, N'-benzyl acrylic acid ureide, N,N'-dimethylmaleic and -fumaric acid monoureide, N-(N'-methyl-carbamyl)-maleic acid imide, N'-methylfurmaric acid monoureide, N',N'-dimethyl maleic and fumaric acid monoureides N',N',N''',N'''-tetramethyl fumaric acid diureide, N-(N'-benzyl-carbamyl) maleic acid imide, methylene-bis-N'-(N-carbamyl) maleic acid imide, methylene-bis-N'-(N-carbamyl)-maleic acid monoamide and N'-alkyl maleic acid monobutyl ester ureide.

Further N-nitrosoacylamides which contain structural units of the general Formula III and are suitable for the polymerization process according to the invention can be prepared by nitrozation in an analogous manner by using conventional nitrozation agents, for example from barbituric acid derivatives which are substituted at the 5-position in the barbituric acid ring by alkylene groups with 2 to 6 carbon atoms, preferably by vinyl, isopropenyl and/or allyl groups and/or by cycloalkenyl groups, such as cyclohexenyl groups.

Such barbituric acid derivatives substituted at the 5-position by alkenyl and/or cycloalkenyl groups include 5-vinyl-5-methyl-barbituric acid, 5-vinyl-5-isopropenylbarbituric acid and 5-vinyl-5-cyclohexen-1'-yl-barbituric acid. Depending on the amount and nature of the nitrozation agent used, one or two N-nitroso groups may be introduced into such barbituric acid derivatives by nitrozation.

Suitable N-nitrosoacylamines of the said kind include N-nitroso-N-benzyl-maleic acid amide, N-nitroso-N-(2-ethylhexyl)-maleic acid monoamide, N,N'-dinitroso-N,N'-dibenzyl maleic acid diamide, 1-nitroso-5-vinyl-5-isopropenyl barbituric acid, 1,3-dinitroso-5-vinyl-5-isopropenyl barbituric acid, 1-nitroso-5-vinyl-5-cyclohexenyl barbituric acid, 1,3-dinitroso-5-vinyl-5-cyclohexyl barbituric acid, N-nitrosomethylene-bis-methacrylamide, N,N'-dinitrosomethylene-bis-methacrylamide and methylene-bis-N'-(N'-nitroso-N-carbamyl-maleic acid monoamide).

Such N-nitrosoacylamines cause branching, initiate cross-linking and act as copolymerization components. Their N-nitroso groups decompose when excited thermally and/or photochemically and/or in the presence of alkaline-reacting substances with the formation of radicals and/or radical branchings. The latter takes place when the N-nitroso compounds are polymerized in by way of their olefinic double bonds into a chain molecule during copolymerization.

It may also be advantageous to copolymerize in the presence of different types of conventional polymerization catalyst, for example peroxides, azobisisobutyronitrile, boron trifluoride or aluminum chloride.

In the photochemical excitation of the copolymerization reaction according to this invention it is sometimes advantageous to add conventional sensitizers, as for example azobisisobutyronitrile or perchlormethylmercaptan. Photochemical excitation may also take place with daylight or ultraviolet light and is in general carried out at temperatures between about −20° and about +60° C.

The nature and amount of N-nitroso compounds to be copolymerized according to the invention depends on the desired properties of the copolymers. In general, for the production of a polymer with a given degree of branching or crosslinking, the smaller amounts of the N-nitroso copolymerization component are required the greater the number of olefinic double bonds and N-nitrosoamide groups per molecule of N-nitroso copolymerization component.

In the copolymerization according to this invention we prefer to copolymerize about 0.1 to 20% by weight, with reference to the total weight of monomers, of olefinically unsaturated N-nitrosoacylamines. For the production of highly crosslinked copolymers is may be advantageous to polymerize unsaturated monomers in admixture with more than 20% by weight, for example with 30 or 40% by weight, of mono-olefinically unsaturated mono-N-nitrosoamides, as for example N-nitroso-N-(2-ethylhexyl)-methacrylamide.

For the production of highly crosslinked copolymers it is advantageous to use about 1 to 10%, preferably 2 to 5% by weight with reference to the total weight of monomers of olefinically unsaturated N-nitrosoacylamines which contain at least two olefinic double bonds and/or at least two N-nitrosoacylamine groups in the molecule.

By adding small amounts of alkaline-reacting substances, for example alkali or alkaline earth hydroxides, such as sodium, potassium or calcium hydroxide, alkali carbonates, such as sodium and potassium carbonate, sodamide, alcoholates of alkali metals, such as lithium, sodium or potassium, aliphatic alcohols, such as methanol, ethanol, propanol, isopropanol or n-butanol, primary, secondary and/or tertiary amines, such as piperidine, pyridine, diethylene triamine or ethanolamines, copolymerization can in some cases be carried out at lower temperatures than without the addition. Such an addition is especially to be recommended when N-nitroso compounds are to be copolymerized according to this invention which have been stabilized for storage with the aid of weak acids, such as acetic acid.

In many cases it is also advantageous to add small amounts of organic and/or inorganic salts of metals of Group VIII of the periodic system, such as cobalt chloride, cobalt naphthenate or nickel sulfate, in the copolymerization.

It is an advantage of this process that copolymers with almost any degree of branching and crosslinking can be prepared. The solubility properties of the polymers, their resistance to high temperatures and chemicals, and also their mechanical and electrical properties, such as their impact strength, elasticity and tendency to become electrostatically charged, can thus be influenced.

Copolymers prepared according to this invention are suitable for example for the production of shaped articles, coatings, sheeting, films and bristles which show distinct advantages over comparable polymers, prepared in the conventional manner, in respect of their physical and chemical properties, such as electric charge, capacity for being dyed and flow range.

When copolymerizing olefines, for example ethylene in accordance with this invention, viscous oils are obtained which can be used as lubricants and plasticizers.

The invention is illustrated in, but not limited by, the following examples. The parts are parts by weight and the $k$ values referred to were determined according to H. Fikentscher, Cellulose-chem. 13, page 58 (1932).

Example 1

A mixture of 12 parts of methyl methacrylate, 8 parts of acrylonitrile and 0.4 part of N-nitroso-N-(2-ethylhexyl)-maleic acid monoamide is polymerized at 60° C. by bulk polymerization. The mean polymerization speed corresponds to about 30% conversion per hour. After about 3 hours, polymerization is discontinued. About 14 parts of a tough rubberlike polymer are obtained the molecules of which are branched and crosslinked. Its $k$ value in dimethylformamide at 25° C. is 106. Elementary analysis gives a composition of 61% C, 7.4% H, 8.5% N, 23.2% O and 17.2% —$OCH_3$. In conjunction with the results of infra-red analysis this analysis shows that the polymer consists of about 58% of polymethyl methacrylate and 40% of polyacrylonitrile, the polymethyl methacrylate component probably having syndiotactical arrangement. The product is insoluble in the usual solvents and difficultly soluble in dimethylformamide. It can be dyed more intensely with the usual vat dyes than copolymers prepared in the conventional manner from 12 parts of methyl methacrylate and 8 parts of acrylonitrile.

The N - nitroso - N - (2-ethylhexyl)-maleic acid monoamide was prepared in the following conventional way:

1 part of N-nitroso-N-(2-ethylhexyl)-maleic acid monoamide was suspended by stirring in 2 parts of chloroform and the suspension cooled at a temperature between 0° and 5° C., at which temperature 0.35 part of dinitrogen trioxide was added to the suspension in small portions. When the first small portion of dinitrogen trioxide is added, the reaction mixture assumes a deep color and the next small portion of dinitrogen trioxide is not added until the color of the reaction mixture has turned to a light green. After all of the dinitrogen trioxide has been added, the reaction mixture is maintained for another half hour at a temperature between 0° and 5° C. Then a small portion (about 0.001 part) of disodium sulfate is added in order to dry the reaction mixture. The sodium sulfate is filtered off and the chloroform removed from the filtrate under reduced pressure at a temperature of about 0° C. There is obtained as a residue 1.12 parts of N-nitroso-N-(2-ethylhexyl)-maleic acid monoamide which begins to decompose at about 60° C.

Example 2

2 parts of 1,3-dinitroso-5-vinyl-5-cyclohexenyl-barbituric acid are added to 100 parts of methyl methacrylate and the mixture is polymerized in bulk at 60° for 5 hours. The average polymerization speed is 6%. The resulting reaction product is dissolved for purification in a mixture of 100 parts of chloroform and 500 parts of benzene and precipitated from the solution with three to four times the volume of petroleum ether. About 26 parts of a polymer having the $k$-value 36 in benzene at 25° C. are obtained.

Example 3

100 parts of styrene have added thereto 2 parts of N-nitroso-N-benzyl-maleic acid monoamide and the mixture is polymerized for 5 hours at 60° C. The reaction product is dissolved for purification in butyl acetate and the polymer precipitated from the solution with three to four times the volume of methanol. About 18 parts of a polymer are obtained which in benzene at 25° C. has the $k$-value 29. The polymer can be dyed with conventional basic and acidic dyes as well as with vat dyes.

Example 4

A mixture of 2.5 parts of 1-nitroso-5-vinyl-5-isopropenylbarbituric acid, 100 parts of acrylic acid and 50 parts of vinyl acetate is polymerized in bulk for two hours at 60° C. The mean polymerization speed is 52% per hour. About 115 parts of a polymer which is insoluble in the usual solvents are obtained.

Example 5

A mixture of 60 parts of methyl methacrylate, 40 parts of acrylonitrile and 3 parts of N-nitroso-N-(2-ethylhexyl)-maleic acid monoamide is irradiated with a mercury high pressure lamp for 3 hours at 25° C. About 75 parts of a copolymer are obtained which has a $k$-value of 44 in dimethylformamide at 25° C.

Example 6

A mixture of 67 parts of acrylic acid, 33 parts of vinyl acetate and 2 parts of 1-nitroso-5-vinyl-5-isopropenyl-barbituric acid is irradiated at 25° C. with a mercury high pressure lamp. After an irradiation period of 3 hours the yield is 63%. A copolymer is obtained which is insoluble in the usual solvents.

Example 7

A mixture of 20 parts of butyl acrylate, 80 parts of methyl methacrylate and 2 parts of N-nitroso-methylene-bis-methacrylamide is irradiated for 4 hours at 25° C. with a mercury high pressure lamp. About 60 parts of a copolymer are obtained which has the $k$-value 69 in benzene at 25° C.

We claim:

1. A process for the production of branched and cross-linked copolymers which comprises: reacting an olefinically unsaturated N-nitrosoacylamine containing at least one olefinic double bond, at least one N-nitrosoacylamine group and having a molecular weight between 114 and 700 with another olefinically unsaturated monomer at a temperature of from about —20° C. to about 180° C., said other olefinically unsaturated monomer being selected from the group consisting of acrylonitrile, methacrylonitrile, acrylamide, methacrylamide, acrylic acid, methacrylic acid, acrylic acid and methacrylic acid esters of alcohols selected from the group consisting of methanol, ethanol, propyl alcohol, isopropyl alcohol, normal butanol, 2-ethylhexyl alcohol, cyclohexanol, cyclo-octanol, decyl alcohol, lauryl alcohol, styrene, o-chlorostyrene, vinyltoluenes, alpha-methylstyrene, vinyl acetate, vinyl propionate, ethylene, propylene, butylene-1, butylene-2, isobutylene, butadiene, 2-chlorbutadiene, isoprene, vinyl chloride, vinylidene chloride, methyl vinyl ether, isobutyl vinyl ether, hexyl vinyl ether, 2-ethylhexyl vinyl ether, decyl vinyl ether, lauryl vinyl ether, and vinyl sulfonic acids.

2. A process for the production of branched and cross-linked copolymers which comprises: reacting N-nitroso-N-(2-ethylhexyl)-maleic acid monoamide having a molecular weight between 114 and 700 with methyl methacrylate at a temperature of from about —20° C. to about 180° C., the amount of N-nitroso-N-(2-ethylhexyl)-maleic acid monoamide being from about 0.1% to about 20% by weight of said methyl methacrylate.

3. A process as in claim 1 wherein from about 0.1% to about 20% by weight of the olefinically unsaturated N-nitrosoacylamine is reacted with said other olefinically unsaturated monomer.

4. A process for the production of branched and cross-linked copolymers which comprises: reacting an olefinically unsaturated N-nitrosoacylamine containing at least one olefinic double bond, at least one N-nitrosoacylamine group and having a molecular weight between 114 and 700, said N-nitroso-acylamine being selected from the group consisting of N-nitroso-N-benzyl-maleic acid amide, N-nitroso-N-(2-ethylhexyl)-maleic acid monoamide, N,N'-dinitroso-N,N'-dibenzyl maleic acid diamide, 1-nitroso-5-vinyl-5-isopropenyl barbituric acid, 1,3-dinitroso-5-vinyl-5-isopropenyl barbituric acid, 1-nitroso-5-vinyl-5-cyclohexenyl barbituric acid, 1,3-dinitroso-5-vinyl-5-cyclohexyl barbituric acid, N-nitrosomethylene-bis-methacrylamide, N,N'-dinitroso-methylene-bis-methacrylamide and methylene-bis-N'-(N'-nitroso-N-carbamyl-maleic acid monoamide) with another olefinically unsaturated monomer at a temperature of from about —20° C. to about 180° C., said other olefinically unsaturated monomer being selected from the group consisting of acrylonitrile, methacrylonitrile, acrylamide, methacrylamide, acrylic acid, methacrylic acid, acrylic acid and methacrylic acid esters of alcohols selected from the group consisting of methanol, ethanol, propyl alcohol, isopropyl alcohol, normal butanol, 2-ethylhexyl alcohol, cyclohexanol, cyclo-octanol, decyl alcohol, lauryl alcohol, styrene, o-chlorostyrene, vinyltoluenes, alphamethylstyrene, vinyl acetate, vinyl propionate, ethylene, propylene, butylene-1, butylene-2, isobutylene, butadiene, 2-chlorbutadiene, isoprene, vinyl chloride, vinylidene chloride, methyl vinyl ether, isobutyl vinyl ether, hexyl vinyl ether, 2-ethylhexyl vinyl ether, decyl vinyl ether, lauryl vinyl ether, and vinyl sulfonic acids.

References Cited by the Examiner

UNITED STATES PATENTS 2,983,642   5/61   Tung _____ 260—78
3,058,961   10/62  Haszeldine _____ 260—87.5

OTHER REFERENCES

Blomquist et al.: Jour. American Chem. Soc., vol. 65, pages 2446–2448, December 1943.

WILLIAM H. SHORT, *Primary Examiner.*

MILTON STERMAN, LOUISE P. QUAST, *Examiners.*